United States Patent
Stefansky

[11] Patent Number: 6,097,577
[45] Date of Patent: Aug. 1, 2000

[54] HYDRODYNAMIC RESISTANT LATCH FOR DATA TRANSDUCER ASSEMBLY AND ROTATING DISK STORAGE DEVICE

[75] Inventor: Frederick Mark Stefansky, Longmont, Colo.

[73] Assignee: Seagate Technology, Inc., Scotts Valley, Calif.

[21] Appl. No.: 09/105,389

[22] Filed: Jun. 26, 1998

[51] Int. Cl.⁷ .............................. G11B 5/54; G11B 21/22
[52] U.S. Cl. ........................................ 360/256; 254/254.2
[58] Field of Search .................................... 360/105, 104, 360/254, 254.2, 256, 256.4

[56] References Cited

U.S. PATENT DOCUMENTS

| | | | |
|---|---|---|---|
| 4,164,766 | 8/1979 | Kaseta et al. | 360/78.13 |
| 4,164,769 | 8/1979 | Kaseta et al. | 360/106 |
| 4,185,309 | 1/1980 | Feldstein et al. | 360/73.09 |
| 4,194,226 | 3/1980 | Kaseta et al. | 360/106 |
| 5,305,169 | 4/1994 | Anderson et al. | 360/105 |
| 5,355,979 | 10/1994 | Stephan et al. | 188/290 |
| 5,452,161 | 9/1995 | Williams | 360/105 |
| 5,694,271 | 12/1997 | Stefansky | 360/105 |
| 5,717,544 | 2/1998 | Michael | 360/104 |

FOREIGN PATENT DOCUMENTS 8-147911  6/1996  Japan .

*Primary Examiner*—William Klimowicz
*Attorney, Agent, or Firm*—Jonathan E. Olson; Shawn B. Dempster; Edward P. Heller

[57] ABSTRACT

A disk drive in which a movable latch locks the data transducer assembly to prevent movement due to shock. The movable latch cooperates with an actuator by engaging an actuator extension arm. The movable latch also engages a stationary magnet with one of two latching magnets. The movable latch arm is mounted to a shaft which extends into a sealed casing which incorporates a plunger. The plunger is located in a chamber filled with viscous fluid which is not subject to migration or outgassing from the chamber. The viscous fluid provides resistance to sudden movements of the plunger. Latch release is achieved by application of low continuous force to the actuator arm by a voice coil motor.

8 Claims, 3 Drawing Sheets

HYDRODYNAMIC RESISTANT LATCH FOR DATA TRANSDUCER ASSEMBLY AND ROTATING DISK STORAGE DEVICE

FIELD OF THE INVENTION

The present invention relates to a latch for locking a data transducer assembly against inadvertent movement across a data storage surface within a rigid disk data storage device. More particularly, the present invention prevents opening of the latch by sudden shocks but allows opening of the latch by a relatively low, continuously applied pressure.

BACKGROUND OF THE INVENTION

Rotating rigid disk magnetic storage devices (sometimes referred to as "drives") typically utilize data transducers which fly upon an air cushion immediately adjacent to the storage surface. The transducer is held just above the surface by an air bearing effect.

In disk drives employing such technology the data transducers are supported by a carriage assembly which is normally biased to position the transducers at a predetermined landing zone on the disk storage surface. In some cases the landing zone is located inside the innermost annular data storage track of the storage surface. In some cases, the driving mechanism may be a linear translator such as a linear voice coil solenoid. In other cases the driver may be a stepper motor or a rotary actuator. In any event, when power is removed, or when the storage disks are not rotating at their normal operating speed, the back EMF of the rotational motor powers the heads to a landing zone where the latch holds them.

The disk storage surface is typically coated with a very thin magnetic material which stores the recorded data for later retrieval and/or replacement. The storage surface is packed with very high data densities, on the order of 10,000,000 bits or more per inch. The storage surface is particularly sensitive to being damaged. Any minute scratch or indentation may deform the storage surface, with resultant loss of data and data storage capability at the damage site.

The movement of a data transducer across the recording surface in the absence of the air bearing or cushion may result in damage to the storage surface from minute scratches or dents. The damage or deformity is caused because of a loading force provided to the transducer to urge it against the disk surface. The loading force is opposed to the force generated by the air bearing effect. The loading force is provided with a value which causes the transducer to come within 1 to 2 microinches of the storage surface during operation.

When the drive is not in operation, the loading force applied to the transducer may be sufficient to dent or gouge the storage surface in the absence of the protective air cushion. Also, the storage surfaces may be dented if the transducers are susceptible to severe, complex rotational and/or translational forces sometimes encountered during unusually rough shipping and handling. As disk drives become smaller, and as they move through commerce by common carriers unaccustomed to handling delicate instruments, such drives have become susceptible to storage surface damage arising from severe handling.

The most common damage sustained by severe handling has been denting of the storage surface. Such dents are caused by severe shock forces having substantial components normal to the parallel planes of the disk surfaces. As already mentioned, such dents are known to prevent the drive from storing data at the locations thereof. If such dents occur during shipment and/or handling between the factory and the user, their presence will go undetected until data storage errors are encountered by the user.

The requirement to lock the data transducer assembly of a rotating rigid disk data storage device during shipment and handling is recognized in the prior art. There are three general approaches: mechanical locking devices; solenoid safety latches which are disengaged only when the drive is in operation; and, permanent magnet latches which lock the assembly against movement in response to shocks below a threshold force level.

Mechanical latches come in many forms. One is an air-driven device (see U.S. Pat. No. 4,979,062) which uses air currents generated by the moving disc. Another is a counter rotating device that is activated by shocks and is spring loaded. Both types work most of the time. Solenoids are usually effective (see U.S. Pat. No. 5,216,682; 4,965,684; 5,694,271), but they add additional cost and power consumption overhead. Permanent magnets are only partially effective (see U.S. Pat. No. 5,170,300 and 5,452,159). They have the drawback that very severe shocks to the drive may overcome the locking force, leading directly to the infliction of the damage sought to be avoided.

One drawback of disk drives is that the unit must be assembled and operated in a very clean, dust free environment. Once assembled, the drive is enclosed within a hermetically sealed housing to protect against intrusion of unfiltered ambient air. This ultra-clean environment renders impractical the use of temporary, removable locking members or devices to manually lock the actuator assembly within the disk drive enclosure.

A need has therefore arisen to provide a more satisfactory locking mechanism which will lock the data transducer assembly at a safe position whenever severe mechanical forces or shocks might be encountered, and which will release to enable normal operation of the drive when the storage disks are rotating.

SUMMARY OF THE INVENTION

A general object of the present invention is to provide a latch which effectively prevents transducer movement across data tracks when a sharp shock is imposed on the disk drive.

A related object of the present invention is to allow the latch to be opened to free the actuator arm from movement across the surface of the disk drive by the application of a relatively low power force to the actuator arm of the motor.

A further object of the invention is to provide a simple, inexpensive and reliable mechanical locking mechanism which may be included within the sealed enclosure of a rotating rigid magnetic disk data storage device without creating any problems due to outgassing or particle generation.

These objects and advantages are achieved by providing a moveable latch located adjacent to the actuator arm of a disk drive, the latch arm being mounted to a shaft which extends into a sealed casing which incorporates a plunger submerged in a viscous fluid. The plunger or paddle will provide resistance to any sudden movement of the shaft and thus any release of the actuator arm from its position in the landing zone in the event of a sudden shock; however, the imposition of even a relatively low force of extended duration will cause the paddle to move through the chamber allowing the shaft to rotate and moving the latch mechanism away from the actuator arm, allowing the actuator arm to move freely over the surface of the disk in response to signals applied to the motor supported on the actuator arm.

The foregoing and other objects, advantages and features of the present invention will become apparent to a person of skill in the art upon consideration of the following detailed description of a preferred embodiment presented in conjunction with the accompanying drawings.

DETAILED DESCRIPTION OF A PREFERRED EMBODIMENT

Figure 1:
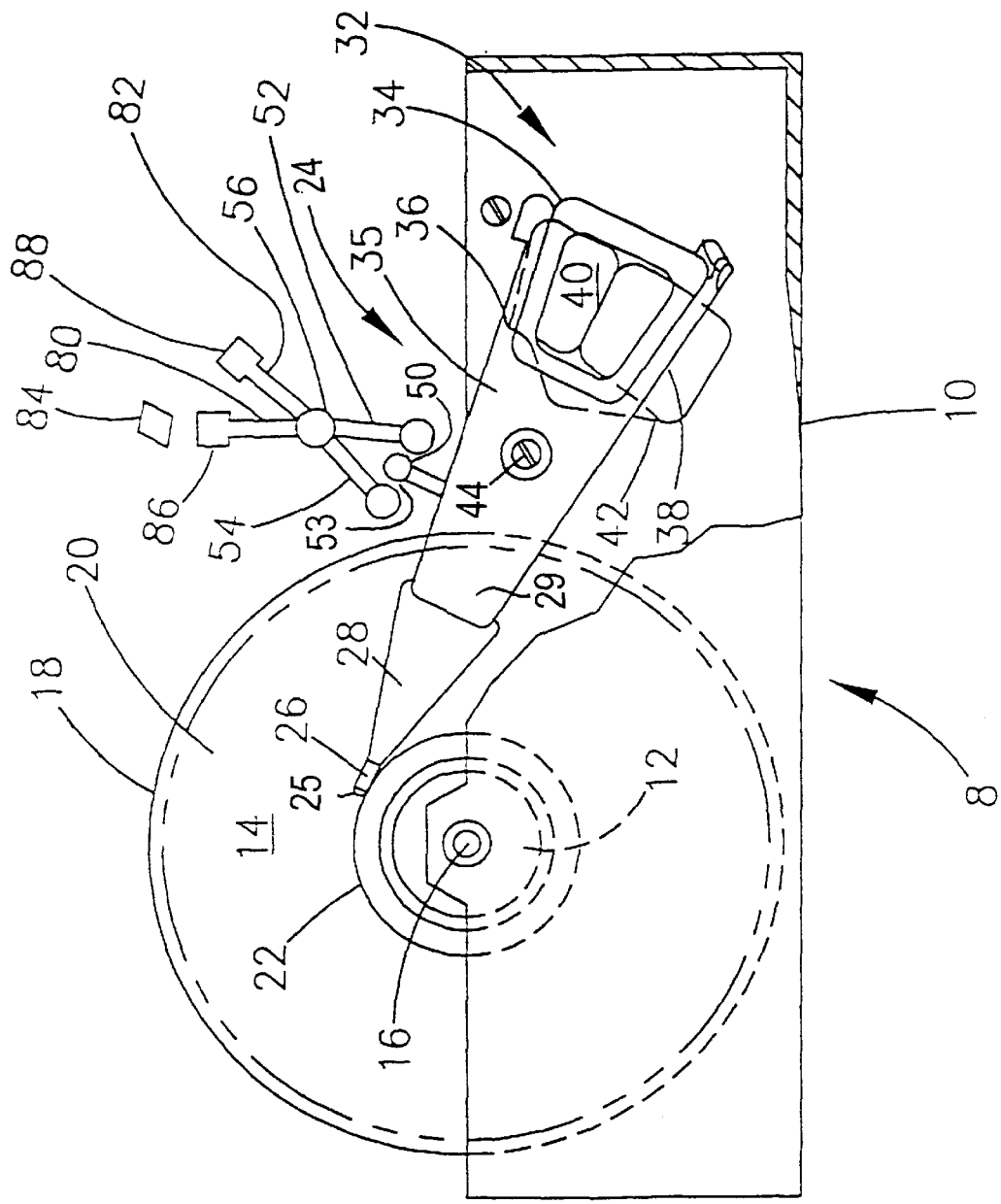
FIG. 1 is a top plan view of a rotating disk data storage device which incorporates principles of the present invention.

Referring now to FIG. 1, this figure is a partial illustration of a disk drive data storage device 8. The disk drive 8 has a frame 10 which acts to support all the other major components of the disk drive 8. The frame 10 supports disk drive motor 12 which rotates disk or disks 14 about axis 16. Disk 14 may be a stack of a plurality of disks or may be only a single disk, all coaxial to axis 16. The disk 14 has a coating of magnetically recordable media, and comprises several areas including an outer zone 18, a recording area 20, and a landing or parking zone 22. An actuator 24 provides the capability for sweeping the slider 26 supported by load beam 28 which in turn is attached to actuator arm 30.

Actuator arm 35, transducer support carriage 29, load beam 28 slider 26, and data transducer 25 are all controlled in their movement across the recording surface of the disk by the actuator motor 32. Motor 32 is comprised of a voice coil 34 supported between legs 36 and 38 of the actuator arm 35. Voice coil 34 interacts with a high flux density magnetic field created by plate magnets 40, 42. When an electrical current is provided to voice coil 34, the interaction between the magnetic field generated by the voice coil 34 and the magnetic fields of plate magnets 40, 42 will create a lateral driving force which will cause the lateral movement of voice coil 34 and pivoting of actuator legs 36 and 38 and actuator arm 35 about axis 44 to a desired target position on the surface of the disk 14. The continuous pressure locking mechanism of the present invention includes an actuator extension arm 50 extending from the side of the actuator 35 arm and cooperating with a toggle switch or latch 53 comprising arms 52, 54 mounted on a shaft 56 which extends vertically into the chamber 66 (FIG. 2) of the hydrodynamic damper generally indicated at 62 in FIG. 2. The damper includes a plunger or vane 64 which extends vertically through a substantial portion of the chamber 66. The remainder of the chamber 66 is filled with a viscous fluid generally indicated at 68 which is of a type selected so that it does not easily migrate up through the opening between the shaft 56 and the surrounding walls 70 of the chamber, and also of a type which is not likely to emit any gas from the chamber into the sealed area of the disk drive. In the event of a shock, it would be apparent that the plunger or vane 64 could not move quickly through the viscous 68 fluid. Thus the actuator arm 35 would not be disturbed from its position at the landing zone 22. However, when the disk drive is to be put into normal use, then actuation of the voice coil motor 32 will slowly drive the actuator arm 35 in a clockwise direction, imposing a constant force through the actuator extension arm 50 against the arm 52 of the toggle latch 53, causing the latch to open and leaving the actuator arm 35 free to move over the surface of the disk. The continuous pressure exerted by the voice coil 34 is sufficient to move the vane 64 through the viscous fluid 68.

Returning to the final details of FIG. 1, this mechanism comprising a rotational damping component for an actuator latch could be used with many latch designs. An example is the toggle type latch 53 shown in FIG. 1. Two further arms 80, 82 extend away from the actuator arm 35 and toward a stationary magnet 84. Each of the magnetic support arms 80, 82 carries a small latching magnet 86, 88 at its end which is distant from the pivot 56. When one of the arms 80 or 82 is latched as shown in FIG. 1, then one of the latching magnets 86 or 88 is aligned with stationary magnet 84 to provide a further bias holding the toggle latch 53 in place. When the actuator arm 35 is moving over the disk data recording area 20, then the latch is rotated far enough so that the magnet 88 is aligned with stationary magnet 84 to hold the toggle switch 53 in place in a second position. When the actuator arm 35 is to be moved back to the storage or landing area 22, then the extension 50 contacts arm 54 to cause the toggle switch to rotate back into its first latching position. Although magnets are preferable to be used to provide this biasing action between the first and second positions, they are not required; an over-center spring or other expedient could just as well be used so that the toggle switch adopts either its first or second position depending on whether the actuator arm 35 is to be held over the landing zone 22 or is to be free to move over the data zone 20.

Figure 2:
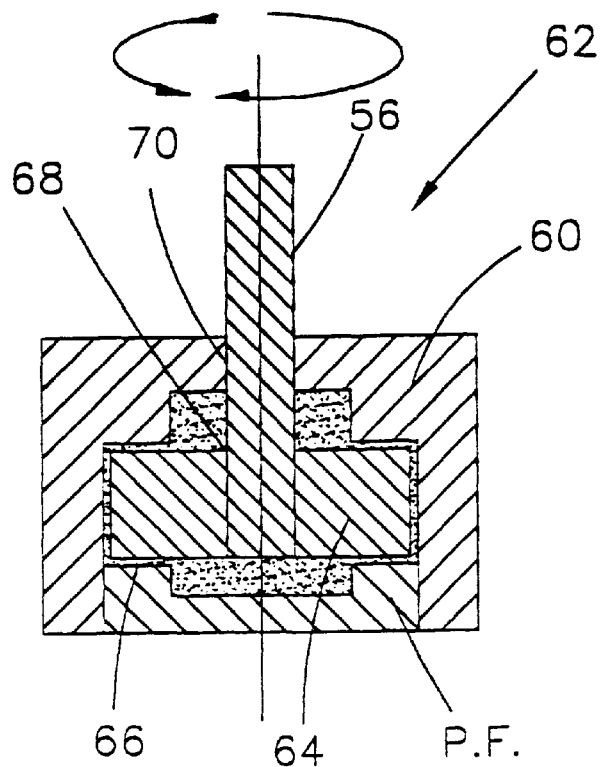
FIG. 2 is a vertical sectional view through the shaft and chamber in which the shaft extends showing details of the damping component.
Figure 3:
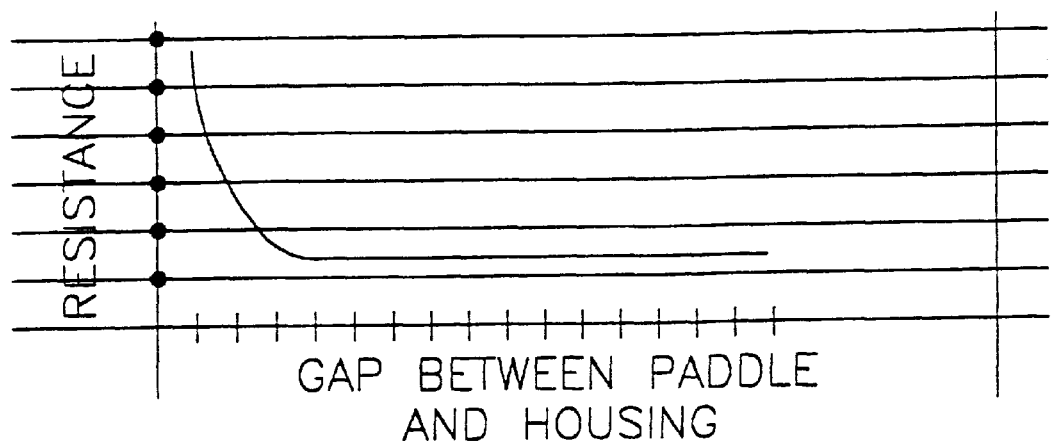
FIG. 3 is a graph showing the relationship between the resistance imposed against movement of the shaft as a function of the gap between the paddle and the side of the housing against which it rests in the locking position.
Figure 4:
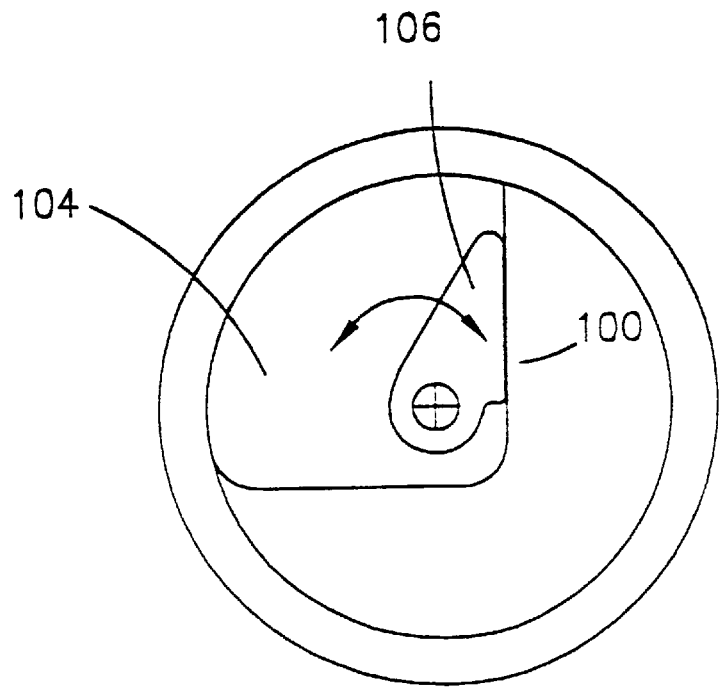
FIGS. 4 and 5 are top plan view and vertical sectional views of detail of the plunger and chamber of the present invention.
Figure 5:
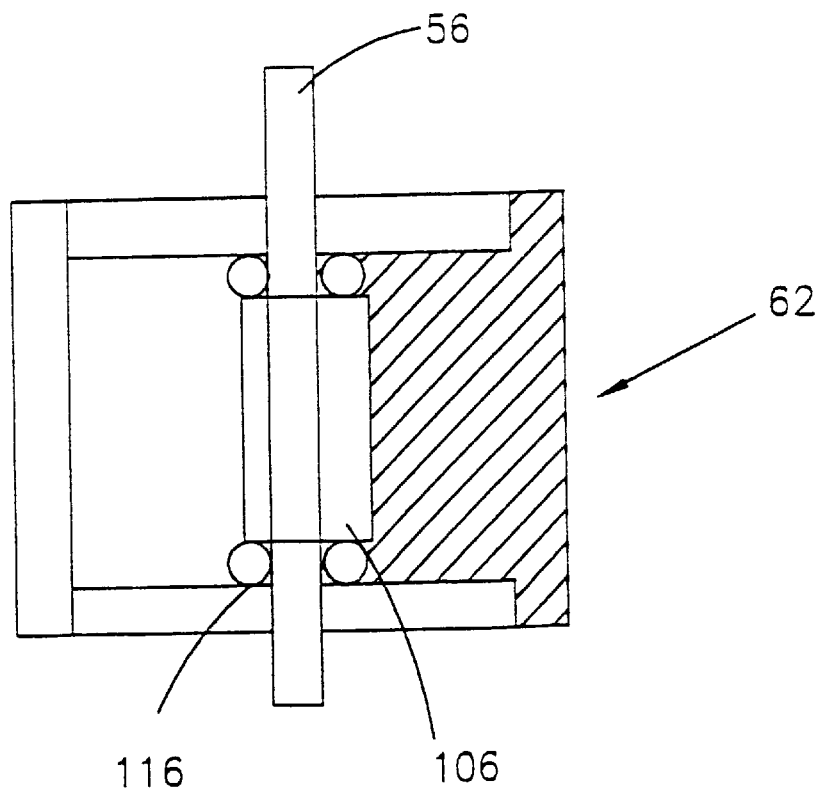

FIGS. 3, 4 and 5 illustrate what may be a preferred form of this invention in that it incorporates a flat surface 100 (FIG. 4) defining at least one end of the stroke. The surface extends as shown at least halfway across the chamber 66. As shown in FIG. 2, the walls 70 of the chamber could also extend all the way across the chamber 66 and essentially define both ends of the stroke. This would create a smaller chamber 104 to be filled with fluid. The plunger is now a vane 106 which rests flat against the wall 100 when the actuator arm 35 is resting over the landing zone 22. In the event of a shock, the resistance to any movement of the vane 106 away from the wall 100 is very high, because the vane 106 and the wall 100 are in contact, and there is only a very limited amount of space for displacing the viscous fluid 68 from one side of the vane 106 to the other. As shown in FIG. 3, if the shock is of short duration, the resistance will remain high because the gap will remain zero or very small. However, if it is desired to move the actuator arm 35 over the data zones, then a constant force is applied by the voice coil motor 32. Once the vane or paddle 106 moves away from the end of stroke and creates a gap between the vane 106 and the wall 100, the resistance drops dramatically.

As with the previously described design, a spring or magnetically applied load holds the paddle 106 against the housing under normal circumstances. When a load is applied by the actuator 24 to pull the paddle 106 away from its end of stroke and separate the flat surface 100 of the paddle 106 from the flat surface 100 of the housing, the initial resistance will be quite high because of the contact between the two.

This characteristic is of significant value for disk drive latches. A rotational shock will never have a high enough force and be of long enough duration to move the paddle 106 away from its position at the end of stroke. However, the actuator 24 can apply a sustained force, and easily, over a brief period of time, move the paddle 106 away from the wall 100. Once the paddle 106 has moved away from the wall 100, the toggle switch or the like is disengaged from the actuator arm 35 and the actuator arm 55 is free to move over the surface of the disk 14.

The assembly of the design of FIGS. 4 and 5 are easily achieved, and would simply include the plunger or vane 106 mounted on shaft 56 and having o-rings 116 at either end of the chamber 66 to isolate the bearing chamber from the disk drive housing. The chamber 66 could easily be located either incorporated into or just below the base portion of the housing.

Other features and advantages of the present invention will become apparent to a person of skill in the art who studies the present invention disclosure. Therefore, the scope of the present invention is to be limited only by the following claims.

What is claimed is:

1. In a data storage device including a frame and one or more rotating disks,
    at least one data transducer capable of flying in close proximity to a data storage surface of said rotating disk upon an air bearing created by rotation of said rotating disk for reading and writing data on said data storage surface,
    a transducer support carriage for supporting and moving said transducer relative to said data storage surface,
    a motor for moving an actuator,
    a movable latch cooperating with an actuator extension arm and engaging said actuator extension arm to hold it against movement in a first position and movable away from said first position in response to continuing force imposed by said motor, said movable latch being supported from a shaft, and
    a plunger axially supported from said shaft and located in a fluid filled chamber, said fluid filled chamber including a wall extending at least partially across said fluid filled chamber, said plunger able to rest against said wall, so that said fluid resists sudden movements of said plunger in said fluid filled chamber but responds to forces created by said motor to move through said fluid filled chamber.

2. A structure as claimed in claim 1 wherein said plunger is a thin wall extending entirely or substantially fully across said fluid filled chamber so that substantial resistance to sudden movements of said plunger is established.

3. A structure as claimed in claim 1, further comprising a landing zone on said rotating disk, wherein said plunger can rest against the wall only when said data transducer is on said landing zone.

4. A structure as claimed in claim 1 wherein said fluid is a viscous fluid which is not subject to migration or outgassing from said fluid filled chamber.

5. A structure as claimed in claim 1 wherein said wall extends all the way across said fluid filled chamber to allow said plunger only to move from an operating position where said movable latch is engaging said actuator extension arm to a second non-operating position where said movable latch is not engaging said actuator extension arm.

6. In a data storage device including a frame and one or more rotating disks,
    at least one data transducer capable of flying in close proximity to a data storage surface of said rotating disk upon an air bearing created by rotation of said rotating disk for reading and writing data on said data storage surface,
    a transducer support carriage for supporting and moving said transducer relative to said data storage surface,
    a motor for moving an actuator,
    a movable latch cooperating with an actuator extension arm and engaging said actuator extension arm to hold it against movement in a first position and movable away from said first position in response to continuing force imposed by said motor, said movable latch being supported from a shaft, wherein said movable latch includes first and second magnet support arms extending toward an actuator extension arm carried on said actuator, said first magnet support arm engaging said actuator extension arm to hold said actuator, and
    a plunger supported from said shaft and located in a fluid filled chamber, said fluid providing resistance to sudden movements of said plunger in said fluid filled chamber but responsive to forces created by said motor to move through said fluid filled chamber.

7. A structure as claimed in claim 6 wherein said second magnetic support arm of said movable latch engages said actuator extension arm only when a toggle switch is to be engaged when said actuator is moving said data transducer away from said data storage surface.

8. A structure as claimed in claim 7 including first and second magnet supporting arms extending from said shaft away from said actuator extension arm and mounted on the same end of said shaft as said toggle switch.

* * * * *